United States Patent
Ha et al.

(10) Patent No.: US 8,559,520 B2
(45) Date of Patent: Oct. 15, 2013

(54) METHOD AND APPARATUS FOR EFFECTIVELY COMPRESSING MOTION VECTORS IN MULTI-LAYER STRUCTURE

(75) Inventors: Ho-Jin Ha, Seoul (KR); Sang-Chang Cha, Hwaseong-si (KR); Woo-jin Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 54 days.

(21) Appl. No.: 13/235,012

(22) Filed: Sep. 16, 2011

(65) Prior Publication Data

US 2012/0039387 A1 Feb. 16, 2012

Related U.S. Application Data

(63) Continuation of application No. 11/094,201, filed on Mar. 31, 2005, now Pat. No. 8,040,950.

(60) Provisional application No. 60/557,709, filed on Mar. 31, 2004.

(30) Foreign Application Priority Data

Apr. 19, 2004 (KR) .................. 10-2004-0026778

(51) Int. Cl.
*H04N 7/12* (2006.01)

(52) U.S. Cl.
USPC .................................... 375/240.16

(58) Field of Classification Search
USPC .................................... 375/240.16
See application file for complete search history.

(56) References Cited

U.S. PATENT DOCUMENTS

| | | |
|---|---|---|
| 6,275,531 B1 | 8/2001 | Li |
| 6,510,177 B1 | 1/2003 | De Bonet et al. |
| 6,934,336 B2 | 8/2005 | Kurohmaru |
| 2003/0086498 A1 | 5/2003 | Lee et al. |
| 2004/0005095 A1 | 1/2004 | Wu et al. |

FOREIGN PATENT DOCUMENTS

| | | |
|---|---|---|
| CN | 1209020 A | 2/1999 |
| CN | 1211373 A | 3/1999 |
| EP | 0691789 A2 | 1/1996 |
| JP | 7030899 A | 1/1995 |
| KR | 1019960028481 A | 7/1996 |
| KR | 20000045075 A | 7/2000 |
| KR | 100275694 B1 | 9/2000 |

OTHER PUBLICATIONS

European Search Report, dated Nov. 2, 2010, issued in Application No. 05789740.7.
L. Blaszak, "Scalable AVC Codec," International Organisation for Standardisation, Munich, No. M10626, Mar. 2004, pp. 1-12.

(Continued)

*Primary Examiner* — Richard Torrente
(74) *Attorney, Agent, or Firm* — Sughrue Mion, PLLC

(57) ABSTRACT

A motion vector compression apparatus includes: a down-sampling module for down-sampling an original frame to have a size of a frame in each layer; a motion vector search module for obtaining a motion vector in which an error or a cost function is minimized with respect to the down-sampled frame; a reference vector generation module for generating a reference motion vector in a predetermined enhanced layer by means of a block of a lower layer corresponding to a predetermined block in the predetermined enhanced layer, and motion vectors in blocks around the block; and a motion difference module for calculating a difference between the obtained motion vector and the reference motion vector.

2 Claims, 15 Drawing Sheets

(56) References Cited

OTHER PUBLICATIONS

S.E. Han, "SNR Scalable Coding with Leaky Prediction," ITU—Telecommunications Standardization Sector, Study Group 16—Video Coding Experts Group, No. VCEG-N53, Sep. 21, 2001, pp. 1-9.

R. Lange, "Simple AVC-based Codecs with Spatial Scalability," Image Processing, 2004. 2004 International Conference of Image Processing, Singapore, Oct. 24-27, 2004, pp. 2299-2302.

D. Turaga, "Differential motion vector coding in the MCTF framework," International Organization for Standardization, Shanghai, No. MPEG02/9035, Oct. 2002, pp. 1-10.

V. Bottreau, et al., "A Fully Scalable 3D Subband Video Codec," Proceedings of the 2001 International Conference on Image Processing, vol. 2, pp. 1017-1020, Oct. 7-10, 2001.

L. Luo, et al., "Layer-Correlated Motion Estimation and Motion Vector Coding for the 3D-Wavelet Video Coding," Proceedings of the 2003 International Conference on Image Processing, vol. 2, pp. 791-794, Sep. 2003.

METHOD AND APPARATUS FOR EFFECTIVELY COMPRESSING MOTION VECTORS IN MULTI-LAYER STRUCTURE

CROSS-REFERENCE TO RELATED APPLICATIONS

The present application is a continuation of U.S. patent application Ser. No. 11/094,201, filed Mar. 31, 2005, which claims the benefit of U.S. Provisional Patent Application No. 60/557,709, filed Mar. 31, 2004, and claims the benefit of Korean Patent Application No. 10-2004-0026778, filed Apr. 19, 2004. The entire disclosures of the prior applications are hereby incorporated herein in their entireties by reference.

BACKGROUND OF THE INVENTION

1. Field of the Invention

The present invention relates to a video compression method, and more particularly to a method and an apparatus for elevating compression efficiency of a motion vector (MV) by effectively predicting a motion vector of an enhanced layer by means of a motion vector of a base layer in a video coding method employing a multi-layer structure.

2. Description of the Prior Art

With the development of technology of information and communication including the Internet, image communication as well as text and voice communication has increased. The existing text-based communication method cannot satisfy various requirements of a consumer. Accordingly, a multimedia service has increased, which can provide various types of information such as a text, an image, or a movie. Further, since multimedia data are of large quantities, a large capacity of storage medium and a wide transmission bandwidth are required for such data. Accordingly, in order to transmit multimedia data including text, images, and audio, it is necessary to use a compression coding method.

A basic principle to compress data is to eliminate redundancy of data. That is, data can be compressed by eliminating spatial redundancy, such as repetition of the same colors or objects in an image, temporal redundancy, such as no change of adjacent frames in a dynamic frame or continuous repetition of the same sound in an audio, or visual redundancy, considering that high frequencies are insensible to human eyesight and perception.

Currently, most video coding standards are based on a motion compensation prediction coding method. That is, temporal redundancy is eliminated by a temporal filtering based on a motion compensation and spatial redundancy is eliminated by a spatial transform.

In order to transmit multimedia data generated after redundancy of data is eliminated, a transmission medium is necessary. Herein, transmission performance changes according to a transmission medium. Transmission media currently used have various transmission speeds, from an ultra high speed communication network capable of transmitting data at a speed of several tens of Mbytes per second to a mobile communication network having a transmission speed of 384 kbits per second.

In such environments, in order to support a transmission medium having various transmission speeds or transmit multimedia data at a transmission rate suitable for transmission environments, a data coding method having scalability is more suitable.

Such scalability is a coding scheme which enables a decoder or a pre-decoder to perform a partial decoding with respect to one compressed bit stream, according to a condition such as a bit rate, an error rate, or system resources. The decoder or the pre-decoder can extract a portion of a bit stream coded by a coding method having such scalability and restore a multimedia sequence having a different picture quality, resolution, or frame rate.

Meanwhile, standardization work for scalable video coding is in progress by the Moving Picture Experts Group-21 (MPEG-21) part-13, and a wavelet-based scheme in a spatial transform method is recognized as a powerful method. Further, a technology proposed by a published patent application (US published number 2003/0202599 A1) of Philips, Co., Ltd has attracted considerable attention.

In addition, even a coding scheme, which does not use a wavelet-based compression method such as the conventional MPEG 4 or H.264, has achieved spatial and temporal scalability by employing a multi-layer structure.

Scalable video implemented as a single layer has scalable features focused only on the single layer. In contrast, in scalability employing a multi-layer structure, the scalability can be designed to obtain an optimum performance with respect to each layer. For instance, when a multi-layer structure is formed with a base layer, a first enhanced layer, and a second enhanced layer, the layers can be distinguished from each other according to a quarter common intermediate format (hereinafter, referred to as a QCIF), a common intermediate format (hereinafter, referred to as a CIF), or a 2CIF. Further, SNR scalability and temporal scalability can be accomplished in each layer.

However, since each layer has a motion vector (MV) to eliminate temporal redundancy, the bit budget of the motion vector considerably increases in comparison with one layer structure. Accordingly, the amount of a motion vector used in each layer takes a great portion of a bit budget assigned for an entire compression. That is, effectively eliminating redundancy for a motion vector of each layer has a great influence on the entire quality of video.

FIG. 1 is a view showing one example of a scalable video codec using a multi-layer structure. First, a base layer is defined as a QCIF, 15 Hz (frame rate), a first enhanced layer is defined as a CIF, 30 Hz, and a second enhanced layer is defined as a standard definition (SD), 60 Hz. When a CIF 0.5 M stream is required, only SNR is controlled by 0.5 M in a CIF__30 Hz__0.7 M of the first enhanced layer. In this way, spatial scalability, temporal scalability, and SNR scalability can be achieved. As shown in FIG. 1, since the number of motion vectors increase and thus an overhead of about twice as much as that of the existing scalability employing one layer occurs, motion prediction through a base layer is important.

However, the conventional motion prediction through a base layer in a multi-layer structure employs a method of compressing a difference of a motion vector obtained in each layer. Hereinafter, the conventional method will be described with reference to FIG. 2. In a video transmission having a low bit rate, when a bit, with respect to a motion vector, the size and the position of a variable block to perform a motion prediction, and information (hereinafter, referred to as motion information) regarding a motion prediction, etc., determined according to such a variable block, is saved, and this saved bit is assigned to texture information, picture quality may be improved. Accordingly, when the motion information is also layered after a motion prediction and the layered information is transmitted, picture quality may be improved.

In a motion prediction using a variable block size, a 16 by 16 macroblock may be used as a basic unit of prediction. Herein, each macroblock may be constructed by a combination of a 16 by 16, a 16 by 8, an 8 by 16, an 8 by 8, an 8 by 4, a 4 by 8, and a 4 by 4. Further, a corresponding motion vector may be obtained according to various pixel accuracies such as 1 pixel accuracy, ½ pixel accuracy, or ¼ pixel accuracy. Such motion vectors can be layered and achieved according to the following steps.

First, a motion search of a 16 by 16 block size is performed according to 1 pixel accuracy. A generated motion vector becomes a base layer of a motion vector. FIG. 2 shows a motion vector 1 of a macroblock in the base layer.

Second, a motion search of a 16 by 16 block size and an 8 by 8 block size is performed according to ½ pixel accuracy. A difference between a motion vector searched through the motion search and the motion vector of the base layer is a motion vector difference of a first enhanced layer, and this value is transmitted to a decoder afterward. Motion vectors 11 to 14 as shown in FIG. 2 are obtained by determining a variable block size in the first enhanced layer and finding motion vectors for the determined block size. However, actual transmitted values are difference obtained by subtracting the motion vector 1 of the base layer from the motion vectors 11 to 14. That is, referring to FIG. 3, the motion vector difference of the first enhanced layer becomes vectors 15 to 18.

Third, a motion search of all sub-block sizes is performed according to ¼ pixel accuracy. A difference between a value, which is obtained by adding the motion vector 1 of the base layer and the motion vector difference of the first enhanced layer, and a motion vector searched through the motion search becomes the motion vector difference of the second enhanced layer, and this value is transmitted. For instance, a motion vector difference in a macroblock A is a value obtained by subtracting a difference vector 14 from a difference vector 142 and this value is equal to a value obtained by subtracting a sum of a difference vector 18 and a difference vector 1 from the difference vector 142.

Lastly, motion information of the three layers is respectively encoded.

As shown in FIG. 2, original motion vectors are divided into vectors in three layers. Frames having motion vectors are divided into frames of a base layer and enhanced layers as described above. Accordingly, the entire motion vector information is organized into a group as shown in FIG. 1. In this way, the base layer becomes motion vector information having the highest priority, and it is a component which must necessarily be transmitted.

Accordingly, a bit rate of the base layer must be smaller than or equal to a minimum bandwidth supported by a network and a transmission bit rate of both the base layer and the enhanced layers must be smaller than or equal to a maximum bandwidth supported by the network.

In order to cover a wide range of a spatial resolution and a bit rate, when the aforementioned method is employed, proper vector accuracy is determined according to the spatial resolution, thereby achieving scalability for motion information.

As described above, in order to effectively compress the motion vector of the enhanced vector, a motion prediction is performed by means of the motion vector of the base layer. Since this prediction is an important factor for reducing bits used in a motion vector, it has an important influence on compression performance.

However, the conventional method does not use correlation with adjacent motion vectors, simply obtains only difference with a motion vector of a lower layer, and encodes the obtained difference. Accordingly, a prediction is not performed well, and thus difference of a motion vector in an enhanced layer increases, thereby having a negative influence on compression performance.

SUMMARY OF THE INVENTION

Accordingly, the present invention has been made in view of the above-mentioned problems occurring in the prior art, and it is an object of the present invention to provide a method for effectively predicting a motion vector of an enhanced layer from a motion vector of a base layer.

It is another object of the present invention to provide a method for considering not only a corresponding motion vector but also motion vectors around the motion vector in a base layer when a motion vector of an enhanced layer is predicted.

In order to achieve the above objects, according to one aspect of the present invention, there is provided a motion vector compression apparatus used in a video encoder supporting a motion vector of a multi-layer structure, the motion vector compression apparatus comprising: a down-sampling module for down-sampling an original frame to have a size of a frame in each layer; a motion vector search module for obtaining a motion vector in which an error or a cost function is minimized with respect to the down-sampled frame; a reference vector generation module for generating a reference motion vector in a predetermined enhanced layer by means of a block of a lower layer corresponding to a predetermined block in the predetermined enhanced layer, and motion vectors in blocks around the block; and a motion difference module for calculating a difference between the obtained motion vector and the reference motion vector.

It is preferred, but not necessary, that the motion vector compression apparatus further comprises a filter module for providing a predetermined filter to be applied to an interpolation process for generating the reference motion vector.

It is preferred, but not necessary, that the reference motion vector is generated by designating a block having an area correlation with a predetermined block as a reference block of the lower layer, and interpolating the reference block by means of a predetermined filter.

It is preferred, but not necessary, that the interpolation is performed by applying different reflection ratios to the reference block in proportion to an area correlation.

It is preferred, but not necessary, that the reference motion vector is generated by designating a block having an area correlation with blocks having fixed sizes as a reference block of the lower layer, interpolating the reference block by means of a predetermined filter, obtaining a temporary reference motion vector, and down-sampling the temporary reference motion vectors contained in a block, in which merging occurs, from among the blocks having fixed sizes through application of a cost function by means of the predetermined filter.

In order to achieve the above objects, according to one aspect of the present invention, there is provided a video encoder supporting a motion vector of a multi-layer structure, the video encoder comprising: a motion vector compression module for obtaining motion vectors with respect to a frame in each layer, obtaining a reference motion vector in a predetermined enhanced layer of the multi-layer structure, and calculating a difference between the obtained motion vector and the reference motion vector; a temporal filtering module for filtering frames in a time axis direction by means of the obtained motion vector, thereby reducing a temporal redundancy; a spatial transform module for applying a spatial transform with respect to the frame, from which the temporal redundancy has been eliminated, to eliminate a spatial redundancy, and thus generating a transform coefficient; and a quantization module for quantizing the generated transform coefficient.

It is preferred, but not necessary, that the spatial transform uses one of a discrete cosine transform and a wavelet transform.

It is preferred, but not necessary, that the video encoder further comprises an entropy coding module for losslessly encoding the quantized transform coefficient, a motion vector of a base layer from among the motion vectors, and the difference, and outputting an output bit stream.

It is preferred, but not necessary, that the motion vector compression module comprises: a down-sampling module for down-sampling an original frame to have a size of a frame in each layer; a motion vector search module for obtaining a motion vector, in which an error or a cost function is minimized, with respect to the down-sampled frame; a reference vector generation module for generating a reference motion vector in the predetermined enhanced layer by means of a block in a lower layer corresponding to a predetermined block in the predetermined enhanced layer of the multi-layer structure, and motion vectors in blocks around the block; a filter module for providing a predetermined filter to be applied to an interpolation process for generating the reference motion vector; and a motion difference module for calculating a difference between the obtained motion vector and the reference motion vector.

In order to achieve the above objects, according to one aspect of the present invention, there is provided a video decoder supporting a motion vector of a multi-layer structure, the video decoder comprising: an entropy decoding module for analyzing an inputted bit stream to extract texture information and motion information; a motion vector restoration module for analyzing the extracted motion information to calculate a reference motion vector with respect to a predetermined enhanced layer, adding a motion difference contained in the motion information and the calculated reference motion vector, and thus restoring a motion vector; an inverse quantization module for performing an inverse-quantization for the texture information to output a transform coefficient; an inverse spatial transform module for performing an inverse spatial transform to convert the transform coefficient into a transform coefficient of a spatial domain; and an inverse temporal filtering module for performing an inverse temporal filtering for the transform coefficient by means of the restored motion vector, thereby restoring frames constituting a video sequence.

In the video decoder, the motion vector restoration module comprises: a reference vector calculation module for generating the reference motion vector in the predetermined enhanced layer by means of a block of a lower layer corresponding to a predetermined block in the predetermined enhanced layer and motion vectors in blocks around the block; a filter module for providing a predetermined filter applied to an interpolation process for generating the reference motion vector; and a motion add module for adding the obtained reference motion vector and the motion vector difference, and thus generating a motion vector.

In order to achieve the above objects, according to one aspect of the present invention, there is provided a method for compressing a motion vector of a multi-layer structure, the method comprising the steps of: down-sampling an original frame to have a size of a frame in a base layer and obtaining a motion vector for the base layer; down-sampling the original frame when necessary and obtaining a motion vector for an enhanced layer; generating a reference motion vector in the enhanced layer by means of a block of the base layer corresponding to a predetermined block in the enhanced layer, and motion vectors in blocks around the block; and calculating a difference between the obtained motion vector and the reference motion vector.

In order to achieve the above objects, according to one aspect of the present invention, there is provided a multi-layer video encoding method comprising the steps of: a) obtaining a reference motion vector in an enhanced layer by means of a motion vector of a base layer, and calculating a difference between a motion vector of the enhanced layer and the reference motion vector; b) filtering frames in a time axis direction by means of the obtained motion vector, thereby reducing a temporal redundancy; c) applying a spatial transform with respect to the frame, from which the temporal redundancy has been eliminated, to eliminate a spatial redundancy, thereby generating a transform coefficient; and d) quantizing the generated transform coefficient.

It is preferred, but not necessary, that the multi-layer video encoding method further comprises a step of losslessly encoding the quantized transform coefficient, a motion vector of the base layer, and the difference, thereby outputting an output bit stream.

In the multi-layer video encoding method, step a) may comprise the sub-steps of: down-sampling an original frame to have a size of a frame in each layer; obtaining a motion vector, in which an error or a cost function is minimized, with respect to the down-sampled frame; generating a reference motion vector in the enhanced layer by means of a block in the base layer corresponding to a predetermined block in the enhanced layer, and motion vectors in blocks around the block; and calculating a difference between the obtained motion vector in the enhanced layer and the reference motion vector.

In order to achieve the above objects, according to one aspect of the present invention, there is provided a multi-layer video decoding method comprising the steps of: a) analyzing an inputted bit stream to extract texture information and motion information; b) analyzing the extracted motion information to calculate a reference motion vector with respect to a predetermined enhanced layer, adding a motion difference contained in the motion information and the calculated reference motion vector, thereby restoring a motion vector; c) performing an inverse-quantization for the texture information to output a transform coefficient; d) performing an inverse spatial transform to convert the transform coefficient into a transform coefficient of a spatial domain; and e) performing an inverse temporal filtering for the transform coefficient by means of the restored motion vector, thereby restoring frames constituting a video sequence.

In the multi-layer video decoding method, step b) may comprise the sub-steps of: generating the reference motion vector in the predetermined enhanced layer by means of a block of a base layer corresponding to a predetermined block in the predetermined enhanced layer and motion vectors in blocks around the block; and adding the obtained reference motion vector and the motion vector difference, thereby generating a motion vector.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS

Figure 1:
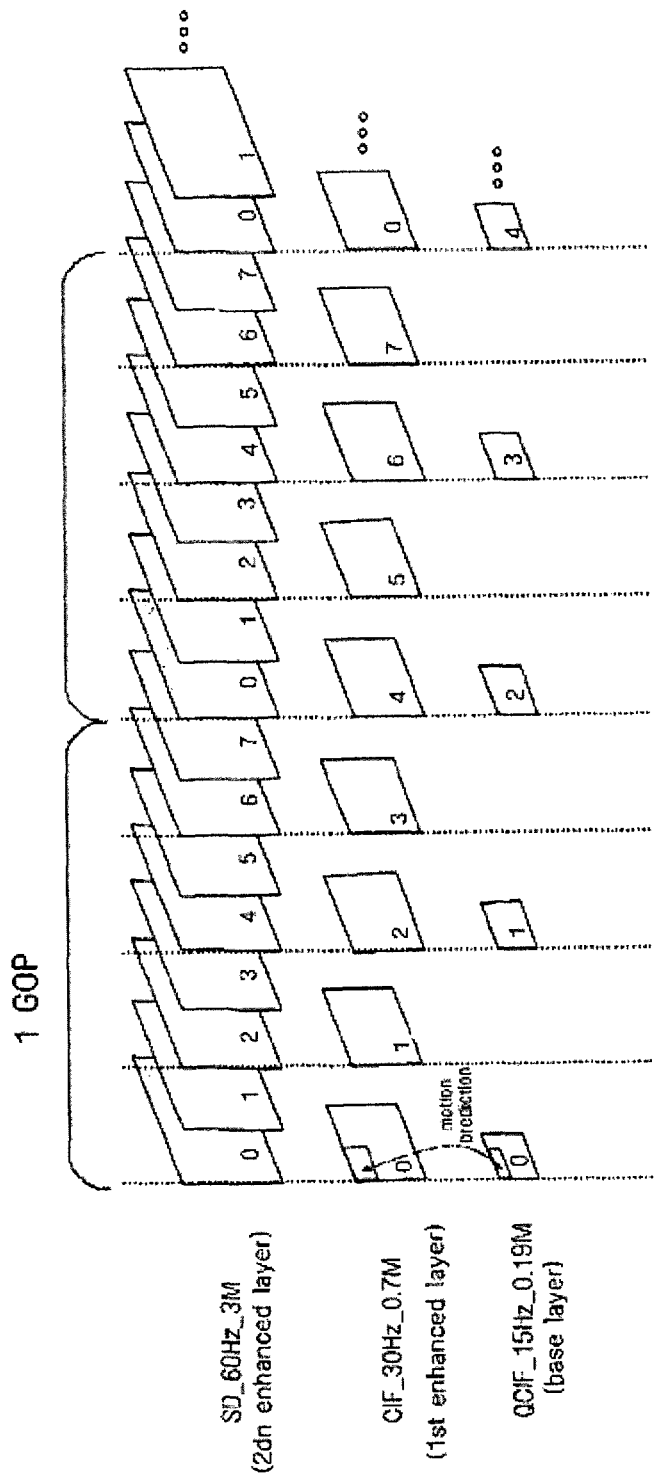
FIG. 1 is a view showing one example of a scalable video codec using a multi-layer structure.
Figure 2:
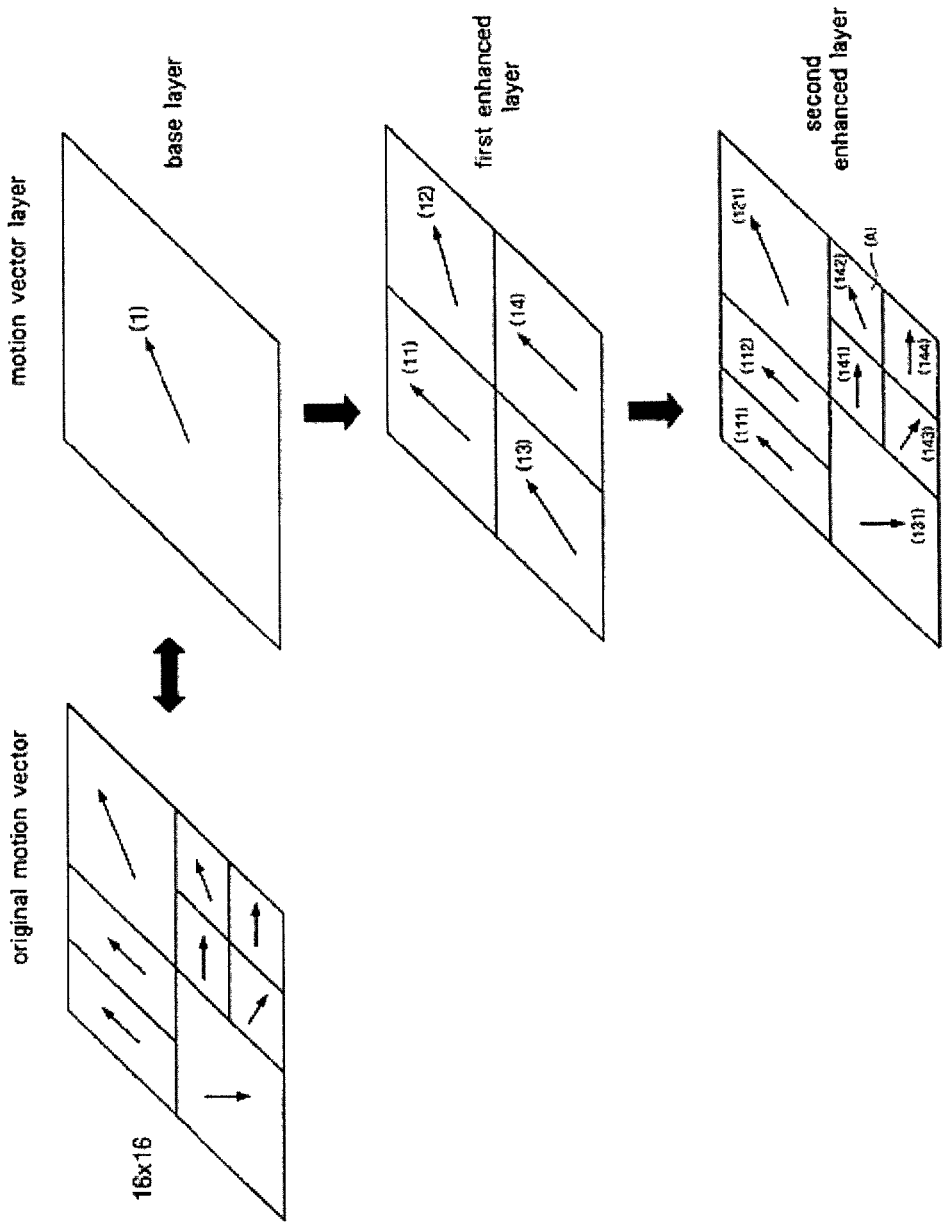
FIG. 2 is a view illustrating a concept used in obtaining a multi-layer motion vector.
Figure 3:
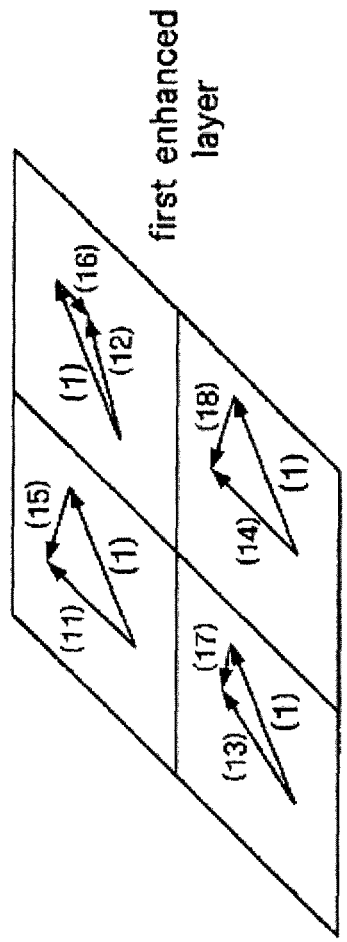
FIG. 3 is a view showing an example of the first enhanced layer in FIG. 2.

Hereinafter, embodiments of the present invention will be described in detail with reference to the accompanying drawings.

Advantages and features of the present invention, and methods for achieving them will be apparent to those skilled in the art from the detailed description of the embodiments together with the accompanying drawings. However, the scope of the present invention is not limited to the embodiments disclosed in the specification, and the present invention can be realized in various types. The described present embodiments are presented only for completely disclosing the present invention and helping those skilled in the art to completely understand the scope of the present invention, and the present invention is defined only by the scope of the claims. Additionally, the same reference numerals are used to designate the same elements throughout the specification and drawings.

Figure 4:
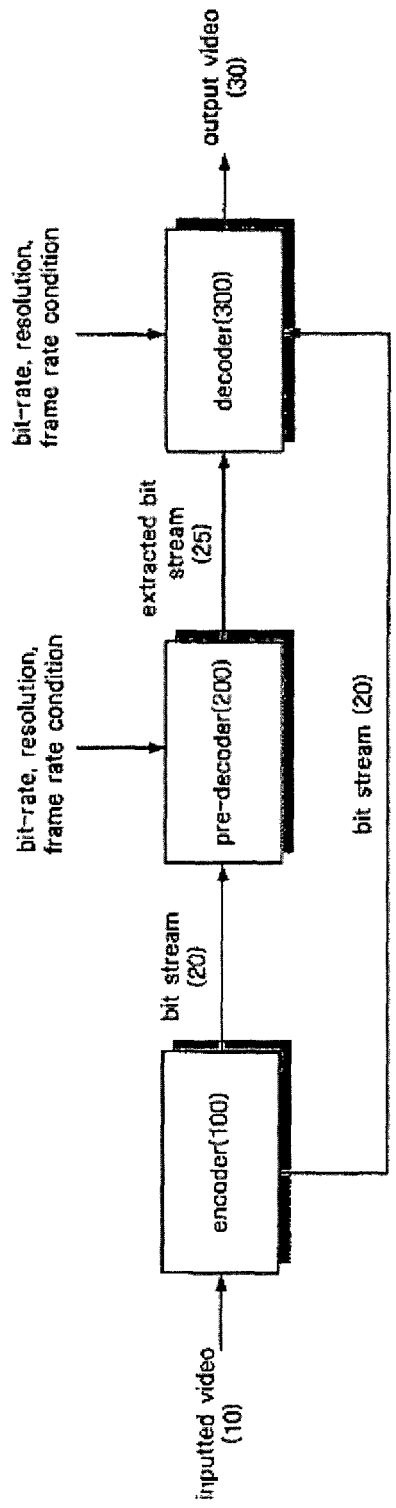
FIG. 4 is a block diagram showing an entire structure of a video/image coding system.

Hereinafter, an entire construction of a video/image coding system will be described with reference to FIG. 4. First, an encoder 100 encodes an inputted video/image 10 to generate one bit stream 20. Further, a pre-decoder 200 employs communication environments with a decoder 300 or conditions (e.g., bit rates, resolutions, or frame rates), which have considered a device performance, etc., in the decoder 300 terminal, as an extraction condition, slices the bit stream 20 received from the encoder 100, and can extract various bit streams 25.

The decoder 300 restores an output video/image 30 from the extracted bit streams 25. Herein, the bit streams are not always extracted by the pre-decoder 200 according to the extraction condition, but can be extracted by the decoder 300.

Further, both the pre-decoder 200 and the decoder 300 may also extract the bit stream.

Figure 5:
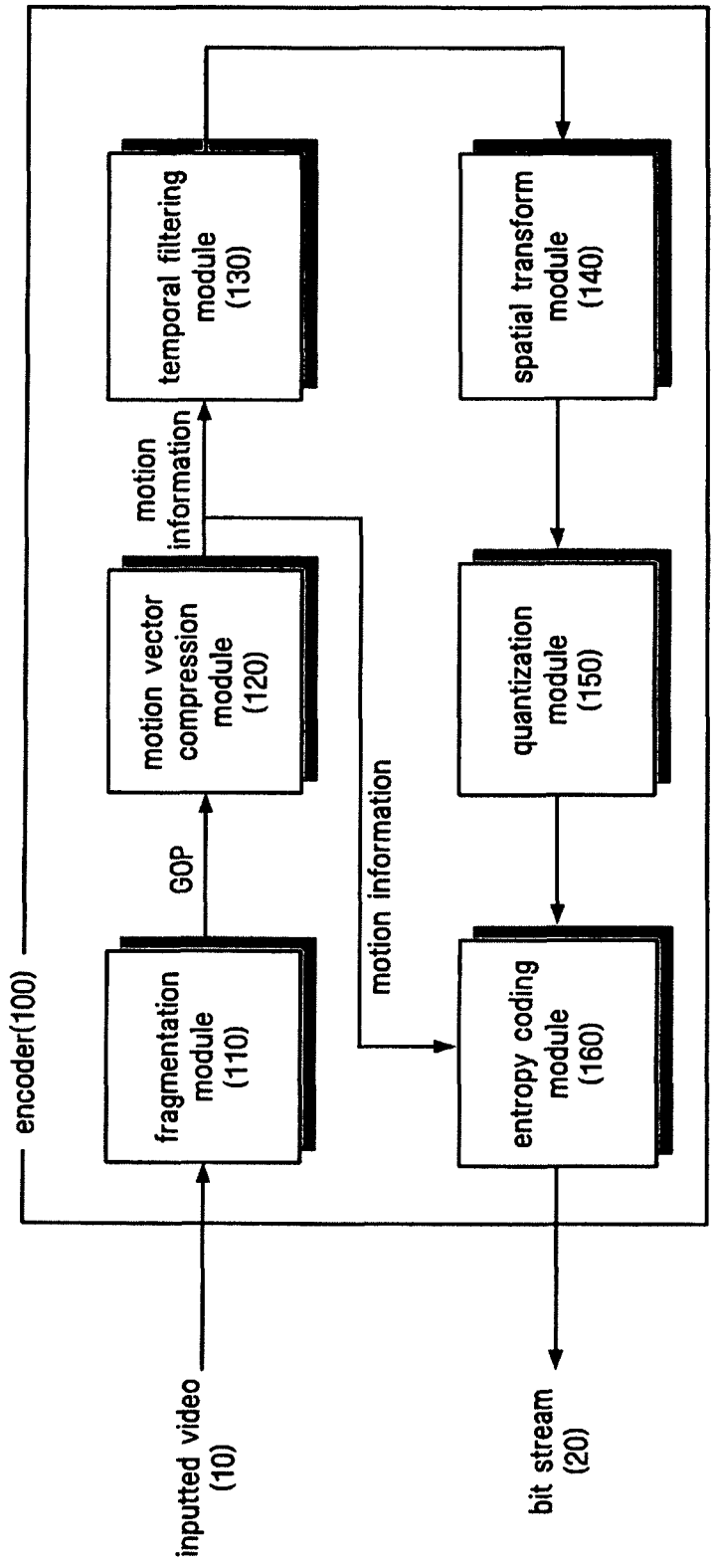
FIG. 5 is a block diagram showing a construction of an encoder according to the present invention.

FIG. 5 is a block diagram showing a construction of the encoder of the video/image coding system. The encoder 100 may include a fragmentation module 110, a motion vector compression module 120, a temporal filtering module 130, a spatial transform module 140, a quantization module 150, and an entropy coding module 160.

First, the inputted video 10 is divided into group of pictures (hereinafter, referred to as a GOP), a basic unit of a coding, by the fragmentation module 110.

The motion vector compression module 120 extracts the inputted GOP, down-samples a frame existing in the GOP to obtain motion vectors in each layer, obtains a reference motion vector in a predetermined enhanced layer, and calculates a difference between the obtained motion vector and the reference motion vector.

Figure 6:
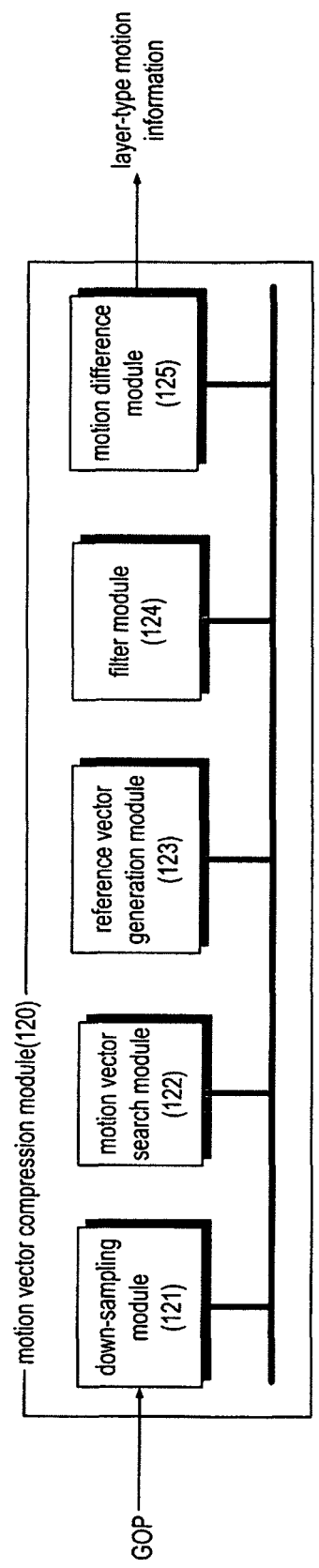
FIG. 6 is a block diagram showing a construction of a motion vector compression vector.

As shown in FIG. 6, the motion vector compression module 120 may include a down-sampling module 121, a motion vector search module 122, a reference vector generation module 123, a filter module 124, and a motion difference module 125.

The down-sampling module 121 down-samples an original frame to have a size of a frame in each layer.

Further, the motion vector search module 122 obtains a motion vector in which either a difference (hereinafter, referred to as an error) of pixel values between the down-sampled frame and a frame to be compared in the course of a temporal filtering, or a cost function is minimized. The cost function will be described in detail with reference to equation 1 which will be described later.

The reference vector generation module 123 generates a reference motion vector in the predetermined enhanced layer by means of a block of a lower layer corresponding to a predetermined block in the predetermined enhanced layer, and motion vectors in blocks around the block.

The filter module 124 provides a predetermined filter to be applied to an interpolation process for generating the reference motion vector, and the motion difference module 125 calculates a difference between the obtained motion vector and the reference motion vector.

Hereinafter, an operation of the motion vector compression module 120 will be described in detail with reference to FIG. 7.

First, the motion vector compression module 120 down-samples an original frame to a base layer by means of the down-sampling module 121 (S10). When a multi-layer structure includes a base layer and two enhanced layers, a second enhanced layer is set to have the same resolution as that of the original frame, a first enhanced layer is set to have a resolution corresponding to ½ of the resolution, and the base layer is set to have a resolution corresponding to ¼ of the resolution. Herein, the down-sampling represents a process by which various pixels are combined into one pixel, and the predetermined filter provided by the filter module 124 is used in the process. The predetermined filter may include a mean filter, a median filter, a bi-cubit filter, a quadratic filter, etc.

Next, the motion vector compression module 120 searches a motion vector for the down-sampled frame, that is, a motion vector $MV_0$ of the base layer (S20). Generally, in a method for searching motion vectors, a current image is divided into macroblocks having predetermined pixel sizes, a macroblock of current frame is compared with the other frame to a pre-determined pixel accuracy (1 pixel or accuracy below 1 pixel), and a vector having a minimum error is selected as a motion vector of the corresponding macro block. Herein, a search range of the motion vectors may be designated in advance by a parameter. When the search range is narrow, a search time is reduced. Further, when a motion vector exists within the search range, the search shows a good performance. However, when the movement of an image is so fast and the images are deviated from the search range, the accuracy of a prediction is reduced. Accordingly, the search range must be properly determined according to a characteristic of an image. Further, since a motion vector in a base layer of the present invention has an influence on the accuracy and the efficiency of a search for a motion vector in another layer, the motion vector in the base layer is subjected to a full area search.

Meanwhile, there is a method using a block having a variable size, in addition to the motion prediction method using the macroblock having a fixed size as described above. The method using the variable block size will be described in detail in a description of step S50 which will be described later.

Herein, a motion vector search may be performed even with respect to a base layer by means of the variable block size. However, in the present invention, a fixed block size is used for a base layer, and the fixed block size or the variable block size is used for an enhanced layer according to embodiments. The enhanced layer is based on the base layer and an error in the base layer is accumulated on the enhanced layer. Accordingly, since it is necessary to perform an accurate search for the base layer, motion vectors are searched with respect to a block having a predetermined fixed size (e.g., 4 by 4; hereinafter, referred to as a basic size) in the base layer.

Figure 8:
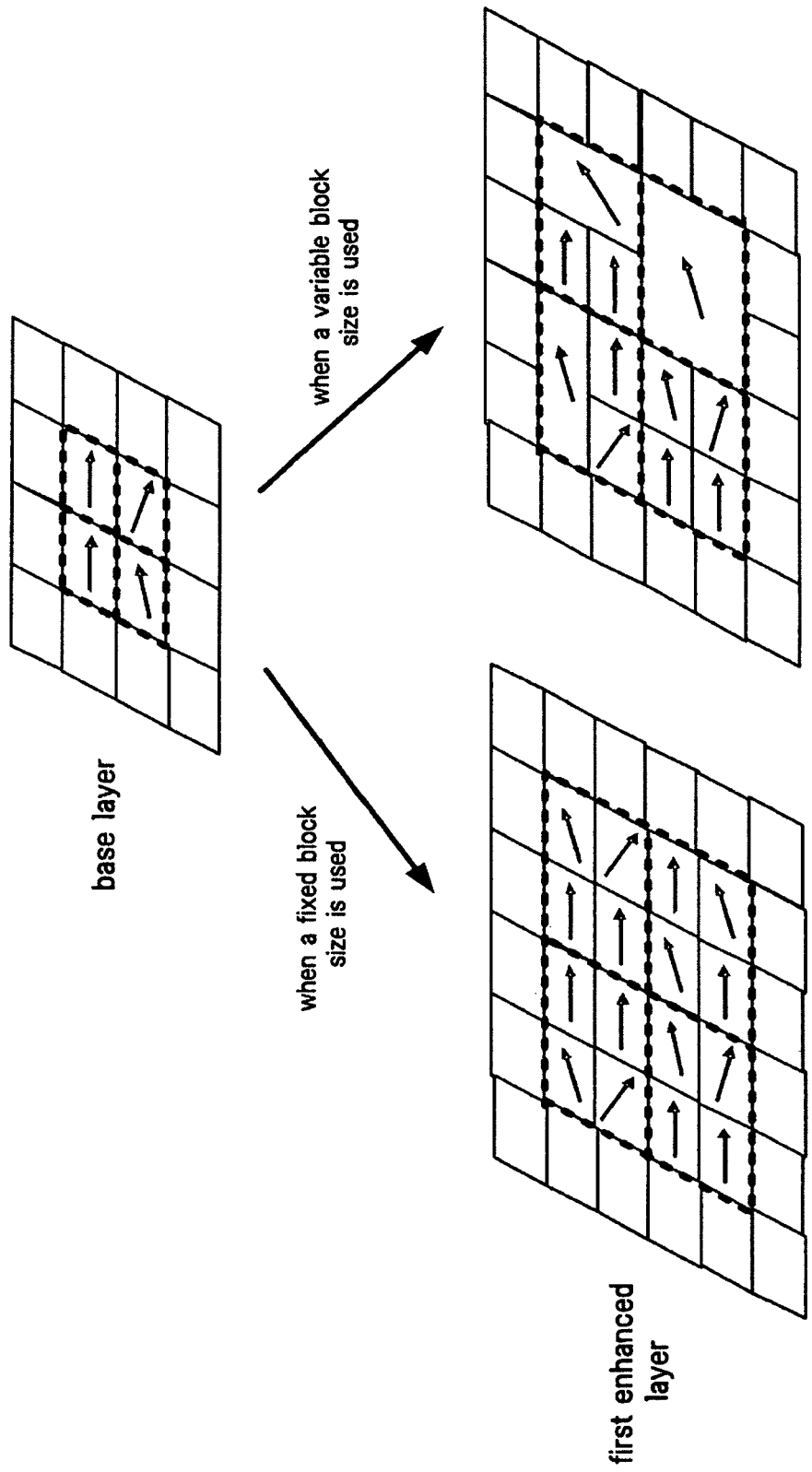
FIG. 8 is a view illustrating cases in which a fixed block size and a variable block size are used for a first enhanced layer.

After the motion vector compression module 120 has searched the motion vector of the base layer (S20) through the process as described above, the motion vector compression module 120 down-samples the original frame to the first enhanced layer (S30) and searches a motion vector $MV_1$ for the first enhanced layer (S40). In searching the motion vector for the first enhanced layer, there are two methods as shown in FIG. 8: a method using the fixed block size and a method using the variable block size. First, when the fixed block size is used, the basic size may be used intact. Accordingly, one block in the base layer corresponds to four blocks in the first enhanced layer.

Figure 10:
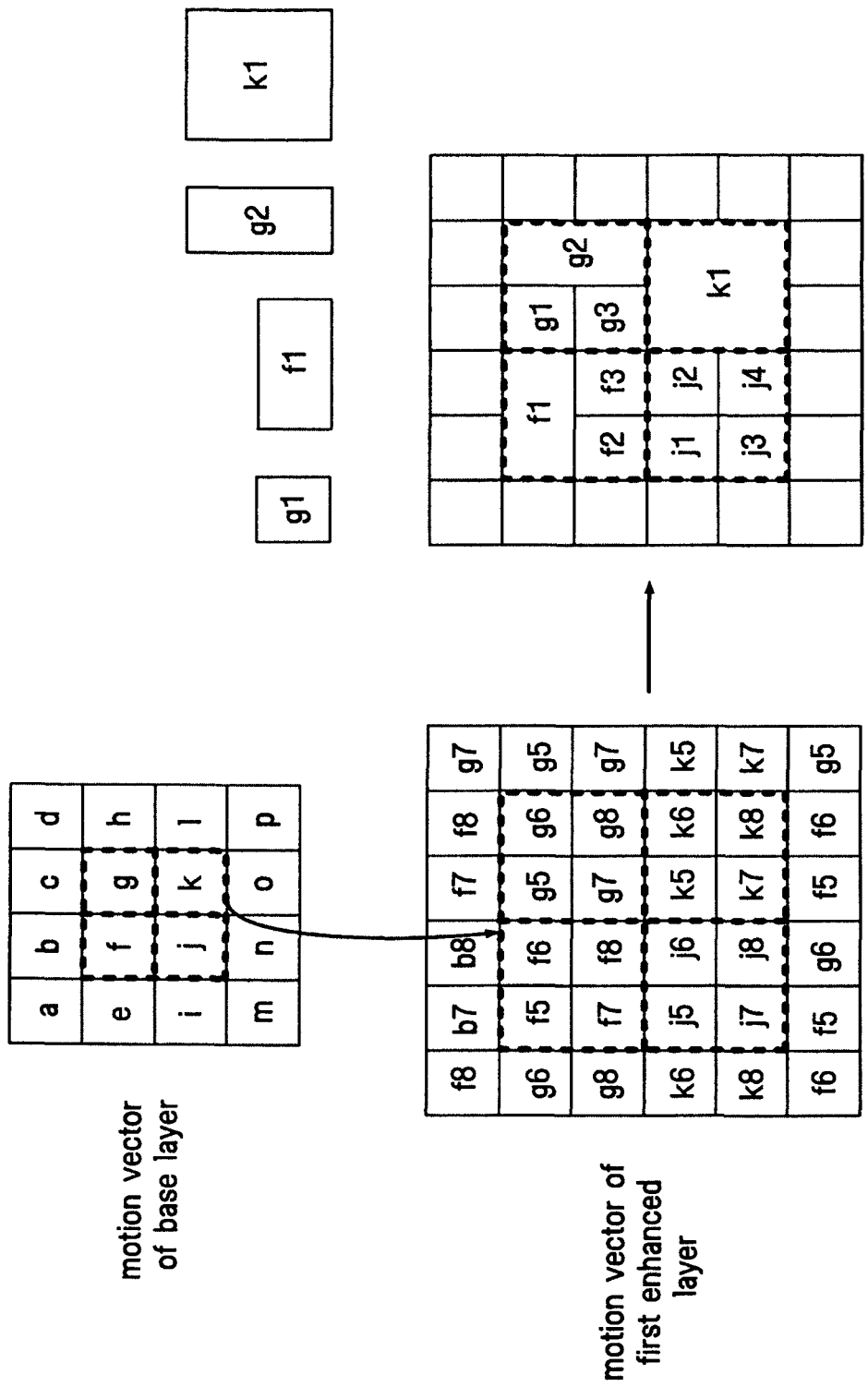
FIG. 10 is a view illustrating a first embodiment and a second embodiment according to the present invention.

Further, when the variable block size is used, the variable block size includes the basic size and is determined according to a condition in which a cost function is minimized. Herein, merging may occur between the four blocks and it is possible that there is no occurrence of the merging between the four blocks. Accordingly, the variable block may include four blocks as shown in FIG. 10 such as a block g1 having a basic size, a horizontal merging block f1, a vertical merging block g2, and a bi-directional merging block k1.

In this way, the size of the block is determined by the cost function. Further, the cost function may be expressed by the following equation.

$$i = E + \lambda \times R$$

The above equation is used in determining the size of the variable block. In the equation, E represents a bit number used in coding a frame difference and R represents a bit number used in coding a predicted motion vector.

In performing a motion prediction of a certain area, a block capable of minimizing the cost function is selected from the block having the basic size, the horizontal merging block, the vertical merging block, and the bi-directional merging block. Actually, the determination of the block size and the determination of a motion vector according to a corresponding block size are not separately performed. That is, in a process of allowing the cost function to be minimized, the block size is determined together with a component of the motion vector according to the determined block size.

Meanwhile, in the motion vector search in the first enhanced layer, the motion vector found in the base layer and an area around the motion vector are employed as a search area, and then the motion vector search is performed. Therefore, a more effective search can be performed when compared with that performed in the base layer.

Next, the motion vector compression module 120 generates a reference motion vector $MV0_r$ of the first enhanced layer by means of the motion vector $MV_0$ of the base layer and information on a motion vector around the motion vector $MV_0$ (S50).

Figure 9:
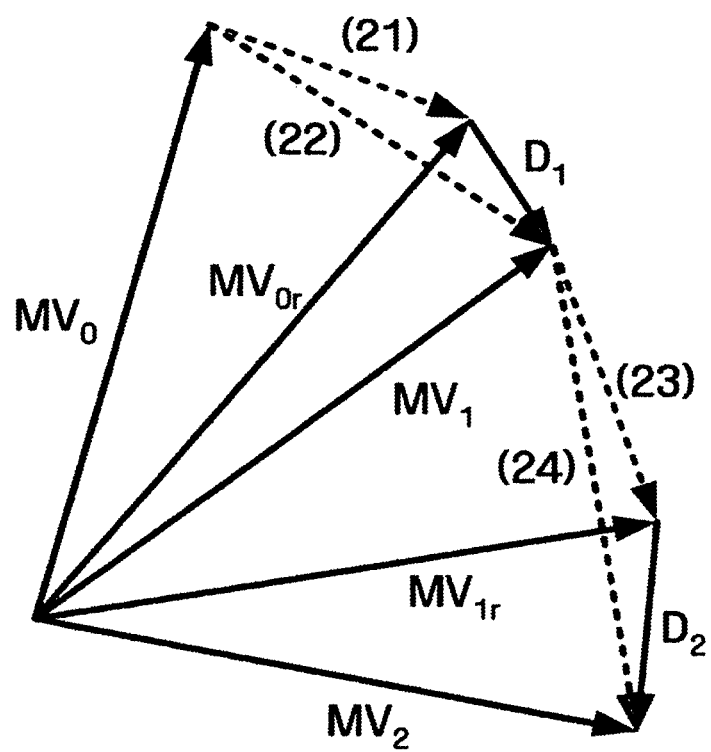
FIG. 9 is a view showing a relation between a motion vector, a reference frame, and a motion vector difference.

To assist in understanding of the present invention, FIG. 9 shows a relation between a motion vector in each layer, a reference frame for obtaining a difference, and a motion vector difference stored in each layer. Basically, the motion vector compression module 120 obtains the motion vector $MV_0$ from a lower layer, generates the virtual reference motion vector $MV0_r$ by means of a predetermined interpolation method, calculates a difference D1 between the motion vector $MV_1$ in the first layer and the reference motion vector $MV0_r$, and stores the difference D1 (S60).

The same manner as described above is also applied to the second layer. That is, the motion vector compression module 120 searches a motion vector $MV_2$ for the second enhanced layer (S70), generates a reference motion vector $MV1_r$ with reference to the motion vector $MV_1$ of the first enhanced layer and a motion vector around the motion vector ($MV_1$) (S80). Further, the motion vector compression module 120 calculates a difference D2 between the motion vector ($MV_2$) and the reference motion vector ($MV1_r$), and stores the difference D2 (S90).

Referring to FIG. 9, the motion vector ($MV_0$) and the motion vector ($MV_1$) move by a vector 21 and a vector 23 respectively when a predetermined interpolation method is used. Herein, in the prior art, a difference between a motion vector and a motion vector of a lower layer, that is, a vector 22 in the first enhanced layer and a vector 24 in the second enhanced layer are stored. However, according to the present invention, the differences D1 and D2 are stored, so that a bit budget necessary for a motion vector is reduced.

For the reduction, firstly, a process for generating the reference motion vectors $MV0_r$ and $MV1_r$ must be performed by reading motion information of a base layer without separate additional information. Secondly, the reference motion vector must be set to have a value considerably near to a motion vector of a current layer.

Hereinafter, the step (S50) for generating the virtual reference motion vector by means of the predetermined interpolation method will be described with reference to FIGS. 10 and 11. In order to generate the virtual reference motion vector, the present invention employs a first method (hereinafter, referred to as a first embodiment) for obtaining a reference motion vector with respect to a fixed block size, and a second method (hereinafter, referred to as a second embodiment) for obtaining a reference motion vector with respect to a fixed block size and then obtaining a reference motion vector with respect to a block, in which a merging has occurred, by means of an interpolation using the obtained reference motion vector for the fixed block size. In addition, there is a third method (hereinafter, referred to as a third embodiment) for obtaining a reference motion vector with respect to a block, in which a merging has occurred, by means of only motion information of a base layer.

Figure 7:
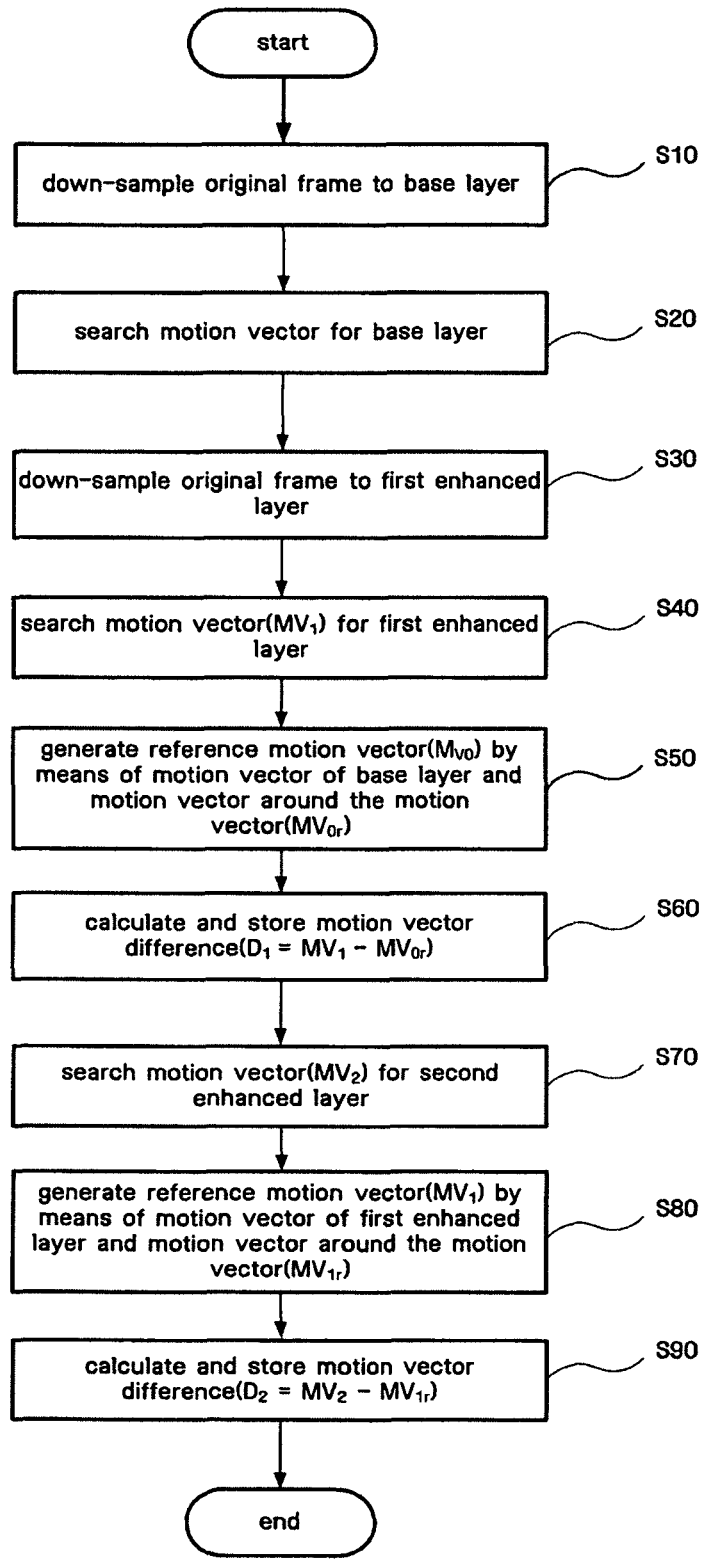
FIG. 7 is a flowchart illustrating an operation of the motion vector compression vector.

The size of a fixed block or a variable block for obtaining such a reference motion vector is equal to that obtained through steps S40 and S70 in FIG. 7, and the number of reference motion vectors is also equal to that obtained through steps S40 and S70 in FIG. 7.

Hereinafter, the first embodiment for obtaining the reference motion vector with respect to the fixed block size will be described with reference to FIG. 10. First, one block in a base layer corresponds to four fixed blocks in a first enhanced layer. For instance, a block f corresponds to an area including blocks f5 to f8. In order to use a predetermined interpolation method for obtaining a reference motion vector, the range of a block (hereinafter, referred to as a reference block) to be referred in the base layer must be determined. Further, the reflection ratio of the reference block must be determined when necessary.

For instance, a reference motion vector of the block f5 designates blocks b, e, and f as the reference block of the base layer, because the block f5 occupies ¼ of a left and upper portion in an area corresponding to the block f from the regional standpoint and has a significant area correlation with the blocks b, e, and f in the base layer. As described above, after the range of the reference block is determined, a filter is applied to the range and an interpolation is performed. Such a filter is provided by the filter module 124 and the filter may include a mean filter, a median filter, a bi-cubit filter, a quadratic filter, etc. For instance, when the mean filter is used, the reference motion vector MVf5 of the block f5 is obtained by adding motion vectors of the blocks b, e, and f with each other, and then dividing the sum of the motion vectors by ⅓.

Further, the range of the reference block may include a block a as well as the blocks b, e, and f, and the reflection ratio of each block may be different from each other. For instance, the reflection ratio of the block b is 25%, the reflection ratio of the block e is 25%, the reflection ratio of the block a is 10%, and the reflection ratio of the block f is 40%. In addition, it is apparent to those skilled in the art that the area of the reference block may be designated by various methods. For instance, the area of the reference block may be designated including not only a block neighboring the reference block but also each block apart from the reference block with a gap interval of one block.

In the same manner as described above, a reference motion vector of a block f8 can designate blocks f, g, and j (or blocks f, g, j, and k) as the reference block of the base layer.

Hereinafter, the second embodiment for obtaining the reference motion vector with respect to a variable block size will be described with reference to FIG. 10. First, a merged block, such as a block f1, a block g2, or a block k1, can be obtained by means of information on the reference motion vector obtained from the first embodiment. In contrast, a block g1 in which a merging has not occurred is determined in advance by the method obtained from the first embodiment.

A reference motion vector MVf1 in the block f1 is calculated by applying a filter to the already calculated reference motion vector MVf5 of the block f5 and a reference motion vector MVf6 of a block f6. For instance, when a mean filter is used, the reference motion vector MVf1 has a mean value of the reference motion vector MVf5 and the reference motion vector MVf6. Herein, other filters may be used instead of or in addition to the mean filter.

A reference motion vector MVg2 in the block g2 is calculated by applying a filter to the already calculated reference motion vector MVg6 of the block g6 and a reference motion vector MVg8 of a block g8. Further, a reference motion vector MVk1 in the block k1 is calculated by applying filters to already calculated reference motion vectors of the blocks k5 to k8.

Accordingly, reference motion vectors can be obtained with respect to all remaining variable blocks, similarly to the methods for obtaining the reference motion vectors with respect to the blocks g1, f1, g2, and k1.

Hereinafter, the third embodiment of the present invention will be described with reference to FIG. 11. The third embodiment refers to a motion vector search method using a variable block size and obtains information on a variable block from motion information of a base layer.

In the motion vector search method, a block having an area correlation with blocks having fixed sizes is designated as a reference block of the base layer, and the reference block is interpolated by means of a predetermined filter, thereby obtaining temporary reference motion vectors. Then, the temporary reference motion vectors contained in a merged block according to the cost function, among the blocks having fixed sizes, are down-sampled by means of the predetermined filter.

Specifically, a reference motion vector (hereinafter, referred to as a temporary reference motion vector) is obtained by the method using a fixed block size in the description of FIG. 10.

Next, the temporary reference motion vectors corresponding to a block, in which a merging occurs, from among the blocks having variable sizes are down-sampled, thereby obtaining a reference motion vector with respect to the block in which the merging occurs.

Since a merging has not occurred in a block g1, a corresponding temporary reference motion vector becomes a reference motion vector.

Since a reference motion vector MVf1 in a block f1 occupies a top-half in an area corresponding to the block f from the regional standpoint, blocks b, e, f, and g having an area correlation are designated as reference blocks of the base layer, and a filter is applied to the reference blocks. Even in such a case, different reflection ratios may be employed. For instance, the reflection ratio of the block b is 30%, the reflection ratio of the block e is 15%, the reflection ratio of the block f is 40%, and the reflection ratio of the block g is 15%.

In the same manner as described above, since a reference motion vector MVg2 in a block g2 occupies a right-half in an area corresponding to the block g from the regional standpoint, blocks c, g, h, and k having an area correlation are designated as reference blocks of the base layer, and a filter can be applied to the reference blocks.

Further, since a reference motion vector MVk1 in a block k1 occupies an entire area corresponding to the block k from the regional standpoint, blocks c, f, g, h, and k having an area correlation are designated as reference blocks of the base layer, and a filter can be applied to the reference blocks.

Accordingly, reference motion vectors can be obtained with respect to all remaining variable blocks, similarly to the methods for obtaining the reference motion vectors with respect to the blocks g1, f1, g2, and k1.

Figure 11:
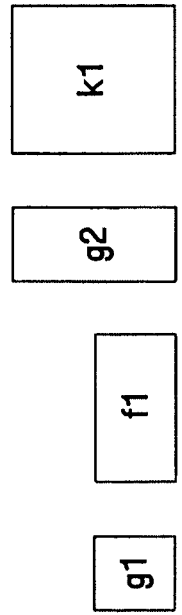
FIG. 11 is a view illustrating a third embodiment according to the present invention.

In the process for obtaining the reference motion vector through the process of FIG. 10 or FIG. 11 as described above, when a method (when a reflection ratio separately exists, the ratio is contained) for designating the reference block and a filter to be used have been determined between the encoder 100 and the decoder 300, a process through which the encoder 100 generates the reference motion vector and a process through which the decoder 300 calculates the reference motion vector may be simply performed by reading the motion information of the base layer. Accordingly, it is not required that the encoder 100 transmit separate additional information to the decoder 300.

Further, a motion vector in a lower layer shows a significant difference with respect to a motion vector in an upper layer. However, when spatial correlation of a motion vector in the present invention is used, the difference can be significantly reduced.

Meanwhile, after generating the reference motion vector (S50), the motion vector compression module 120 subtracts the reference motion vector MV0r of the first enhanced layer from the motion vector MV1 of the first enhanced layer to obtain a motion vector difference in the first enhanced layer, and stores the motion vector difference (S60).

Referring to FIG. 5 again, the temporal filtering module 130 divides frames into low frequency frames and high frequency frames in a time axis direction by means of the motion vector obtained by the motion vector compression module 120, thereby reducing temporal redundancy. Herein, a temporal filtering method may include a motion compensated temporal filtering (MCTF), an unconstrained MCTF (UM-CTF), etc.

The spatial transform module 140 applies a discrete cosine transform (DCT) or a wavelet transform to the frames, from which the temporal redundancy has been eliminated by the temporal filtering module 130, thereby eliminating spatial redundancy. Herein, coefficients obtained through such a spatial transform are called transform coefficients.

The quantization module 150 quantizes the transform coefficient obtained by the spatial transform module 140. Herein, in the quantization, the transform coefficient is not expressed by a random real value, the predetermined number of ciphers of the transform coefficient are discarded so that the transform coefficient has a discrete value, and the transform coefficient having the discrete value is matched to a predetermined index. Specially, when the wavelet transform is used in the spatial transform, an embedded quantization is frequently used. Such an embedded quantization includes an embedded zerotrees wavelet algorithm (EZW), a set partitioning in hierarchical trees (SPIHT), an embedded zeroblock coding (EZBC), etc.

Lastly, the entropy coding module 160 losslessly encodes the transform coefficient quantized by the quantization module 150 and motion information generated through the motion vector compression module 120, and outputs an output bit stream 20.

Figure 12:
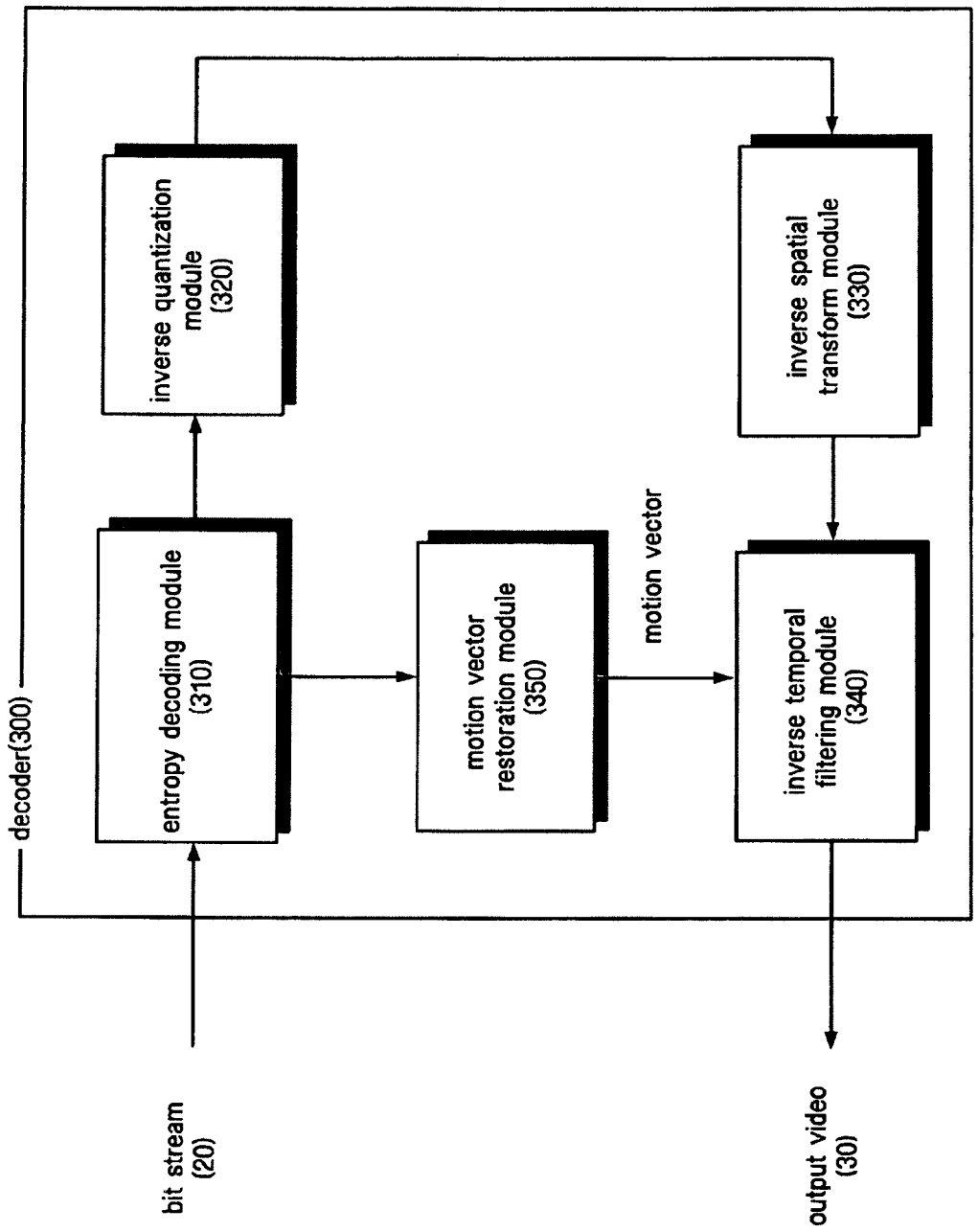
FIG. 12 is a block diagram showing a construction of a decoder according to an embodiment of the present invention.

FIG. 12 is a block diagram showing a construction of the decoder of the video coding system.

The decoder 300 may include an entropy decoding module 310, an inverse quantization module 320, an inverse spatial transform module 330, an inverse temporal filtering module 340, and a motion vector restoration module 350.

First, the entropy decoding module 310 is a module for performing a function inverse to an entropy coding, and analyzes the inputted bit stream 20 to extract texture information (encoded frame data) and motion information from the bit stream 20.

The motion vector restoration module 350 analyzes the motion information extracted by the entropy decoding module 310, calculates a reference motion vector with respect to a predetermined enhanced layer, and adds a motion difference contained in the motion information and the calculated reference motion vector, thereby restoring a motion vector.

Figure 13:
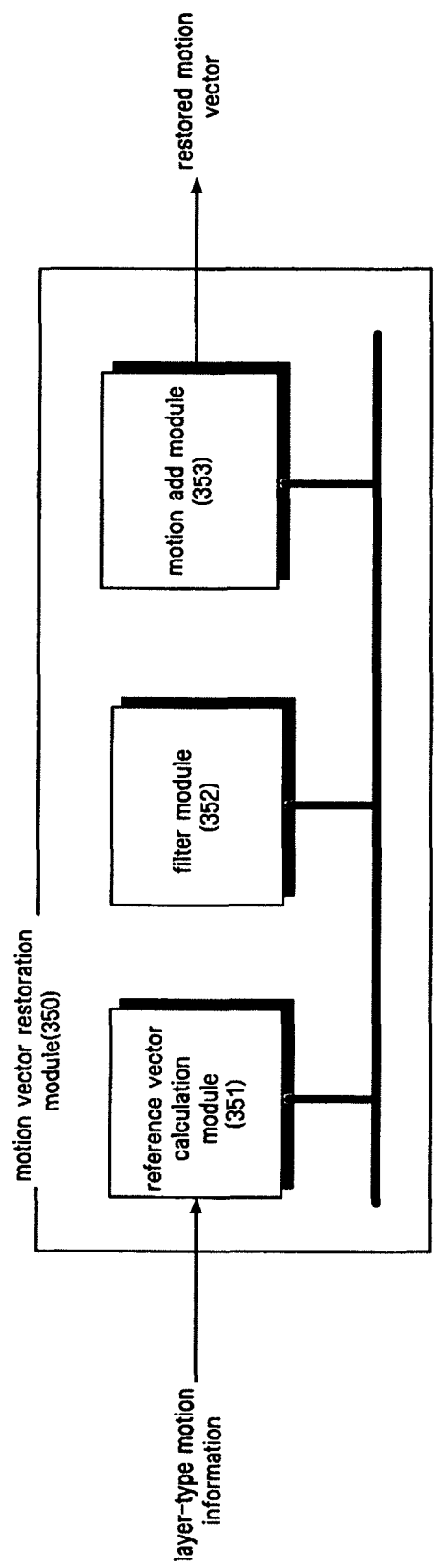
FIG. 13 is a block diagram showing a construction of an exemplary vector restoration module.

Hereinafter, a construction of the motion vector restoration module 350 will be described in detail with reference to FIG. 13. The motion vector restoration module 350 includes a reference vector calculation module 351, a filter module 352, and a motion add module 353.

The reference vector calculation module 351 generates the reference motion vector in the predetermined enhanced layer by means of a block of a lower layer corresponding to a predetermined block in the predetermined enhanced layer and a motion vector in a block around the block.

The filter module 352 provides a predetermined filter applied to an interpolation process for generating the reference motion vector. Further, the motion add module 353 adds the obtained reference motion vector and the motion vector difference, thereby generating a motion vector.

Figure 14:
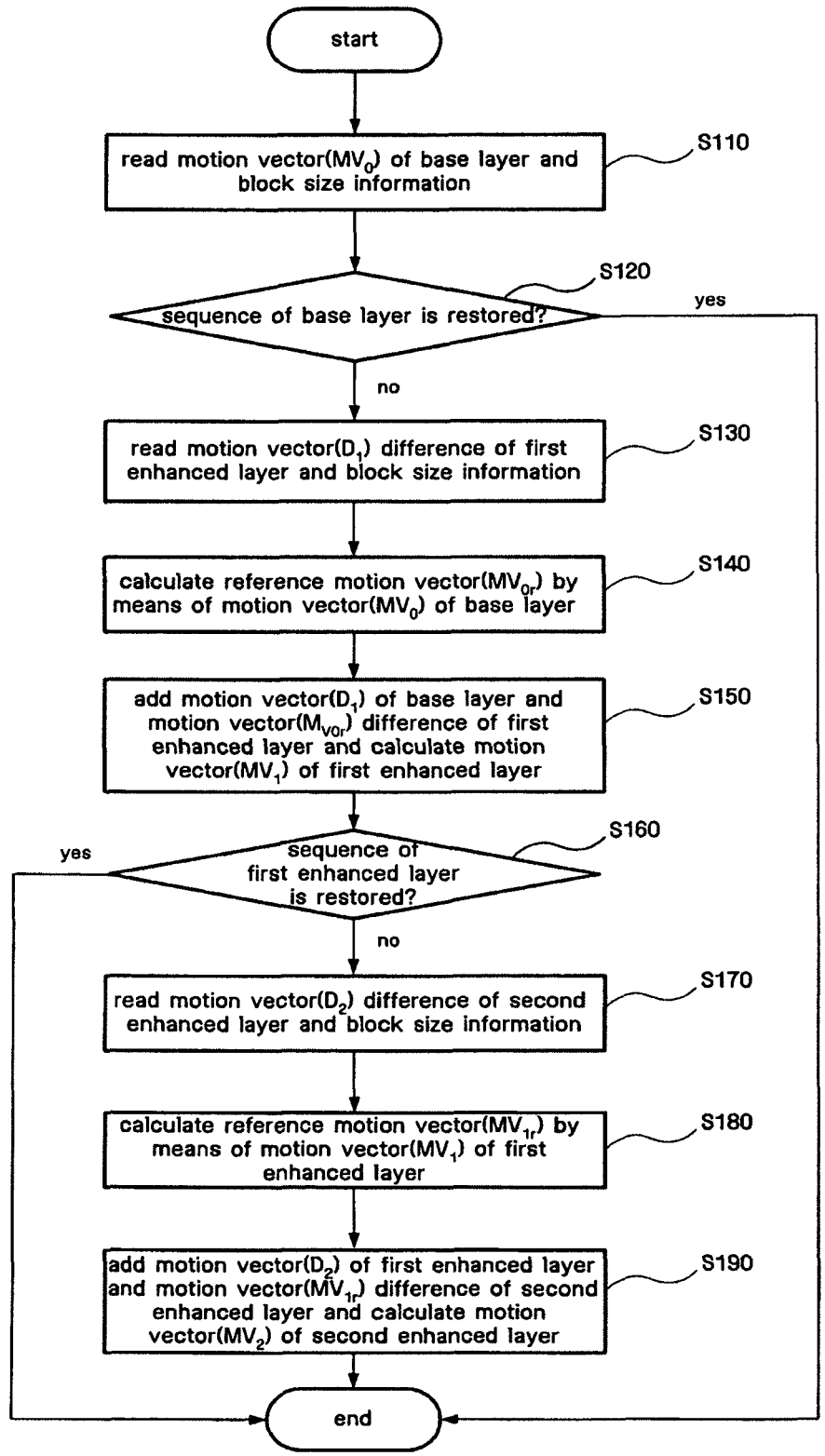
FIG. 14 is a flowchart illustrating an operation of the vector restoration module.

Hereinafter, an operation of the motion vector restoration module 350 will be described in detail with reference to FIG. 14. First, the motion vector restoration module 350 reads the motion vector $MV_0$ of the base layer and block size information from the extracted motion information (S110). When the motion vector restoration module 350 intends to restore the sequence of the base layer (S120), the procedure is ended. Herein, since the encoder 100 has caused the block of the base layer to have a fixed size, all blocks have the same block size information.

In contrast, when the motion vector restoration module 350 does not intend to restore the sequence of the base layer, the motion vector restoration module 350 reads the difference D1 of the motion vectors of the first enhanced layer and the block size information from the extracted motion information (S130). When a variable block is used, since the size of a block may change according to each motion vector difference D1, the motion vector restoration module 350 reads the size of the block according to the motion vector difference D1.

Then, the motion vector restoration module 350 calculates the reference motion vector $MV0_r$ of the first enhanced layer by means of the motion vector $MV_0$ of the base layer (S140). Such a process for calculating the reference motion vector is equal to the process (S50 in FIG. 7) through which the encoder 100 generates the reference motion vector. Herein, the process is performed by the range of a reference block, a reflection ratio of a reference block, the kind of filters to be used, and a method arranged between the encoder 100 and the decoder 300. Further, the encoder 100 transmits a predetermined reserved bit containing information on such an arrangement, the decoder 300, which has received a bit stream from the encoder 100 or the pre-decoder 200, reads the information to understand the arrangement. Herein, the decoder 100 and the decoder 300 must know in advance the bits at which the information on the arrangement is contained.

As described above, in calculating the reference motion vector $MV0_r$, since the decoder 300 has only to read the motion information of the base layer, which is necessarily contained in the bit stream, it is unnecessary for the encoder 100 to load the reference motion vector on the bit stream and send the bit stream to the decoder 300.

Then, the motion vector restoration module 350 adds the reference motion vector $MV0_r$ of the first enhanced layer and the motion vector difference D1 of the first enhanced layer, and calculates the motion vector MV1 of the first enhanced layer (S150). Through these processes, the motion vector MV1 is completely restored. Next, when the motion vector restoration module 350 intends to restore the sequence of the first enhanced layer (S160), the procedure is ended, and the restored motion vector MV1 is provided to the inverse temporal filtering module 340.

In contrast, when the motion vector restoration module 350 does not intend to restore the sequence of the first enhanced layer, the motion vector restoration module 350 reads the motion vector difference D2 of the second enhanced layer and block size information (S170). When a variable block is used, since the size of a block may change according to each motion vector difference D2, the motion vector restoration module 350 reads the size of the block according to the motion vector difference D2.

Then, the motion vector restoration module 350 calculates the reference motion vector $MV1_r$ of the first enhanced layer by means of the motion vector $MV_1$ of the first enhanced layer (S180). It is apparent to those skilled in the art that this process can be performed through a process similar to S140.

Next, the motion vector restoration module 350 adds the reference motion vector $MV1_r$ of the first enhanced layer and the motion vector difference D2 of the second enhanced layer, and calculates the motion vector $MV_2$ of the second enhanced layer (S190). Through these processes, the motion vector MV2 is completely restored, and the restored motion vector MV2 is provided to the inverse temporal filtering module 340.

Meanwhile, the inverse quantization module 320 performs an inverse-quantization for the extracted texture information to output a transform coefficient. Such an inverse-quantization process is a process for finding a quantized coefficient matched with a value which has been expressed by a predetermined index and then transmitted by the encoder 100. Herein, a table representing a matching relation between the index and the quantized coefficient is sent from the encoder 100.

The inverse spatial transform module 330 performs an inverse spatial transform and converts the transform coefficients to transform coefficients on a spatial domain. For instance, in the case of a discrete cosine transform method, transform coefficients are inverse-converted from a frequency domain to a spatial domain. In the case of a wavelet method, transform coefficients are inverse-converted from a wavelet domain to a spatial domain.

The inverse temporal filtering module 340 performs an inverse temporal filtering for a transform coefficient (i.e., temporal difference image) in the spatial domain, and restores frames constituting a video sequence. For the inverse temporal filtering, the inverse temporal filtering module 340 uses the motion vector provided from the motion vector restoration module 350.

The term "module" used in the present specification represents a software element or a hardware element, such as an FPGA or an ASIC, and the module performs a predetermined role. However, the module is not limited to software or hardware. Further, the module may be constructed to exist in an addressable storage module, or to reproduce one or more processors. For instance, the module includes elements (e.g., software elements, object-oriented software elements, class elements and task elements), processors, functions, properties, procedures, subroutines, segments of a program code, drivers, firmware, a microcode, a circuit, data, a database, data structures, tables, arrays, and variables. Herein, functions provided by elements and modules may be provided either by a smaller number of combined larger elements and combined larger modules or by a larger number of divided smaller elements and divided smaller modules. In addition, elements and modules may be realized to operate one or more computers in a communication system.

Figure 15:
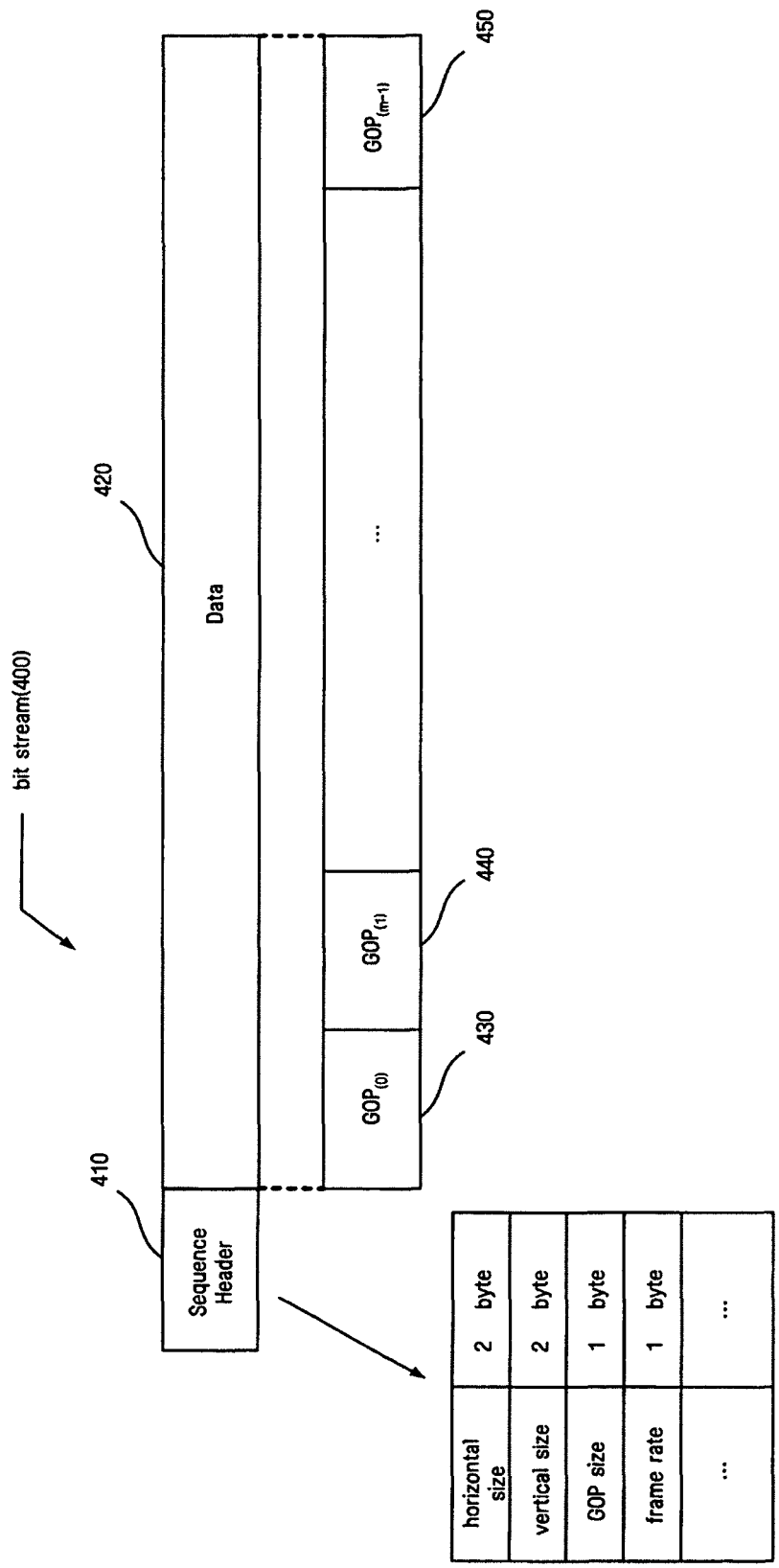
FIG. 15 is a view schematically showing an entire structure of a bit stream.
Figure 16:
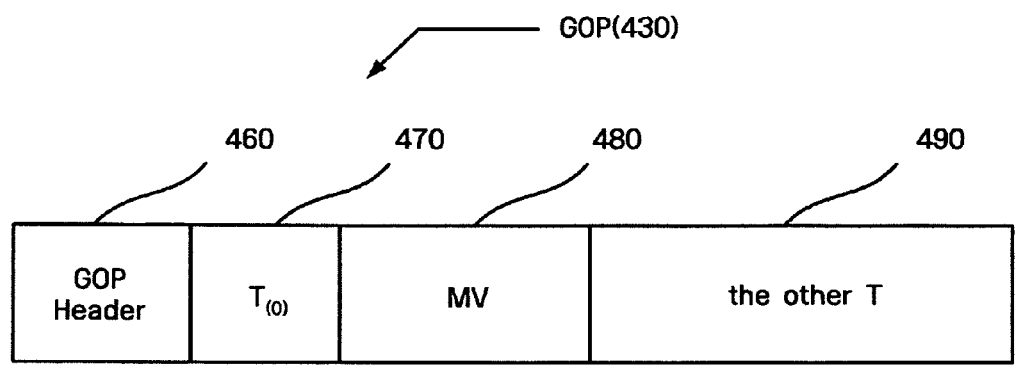
FIG. 16 is a view showing a detailed structure of each GOP field.
Figure 17:
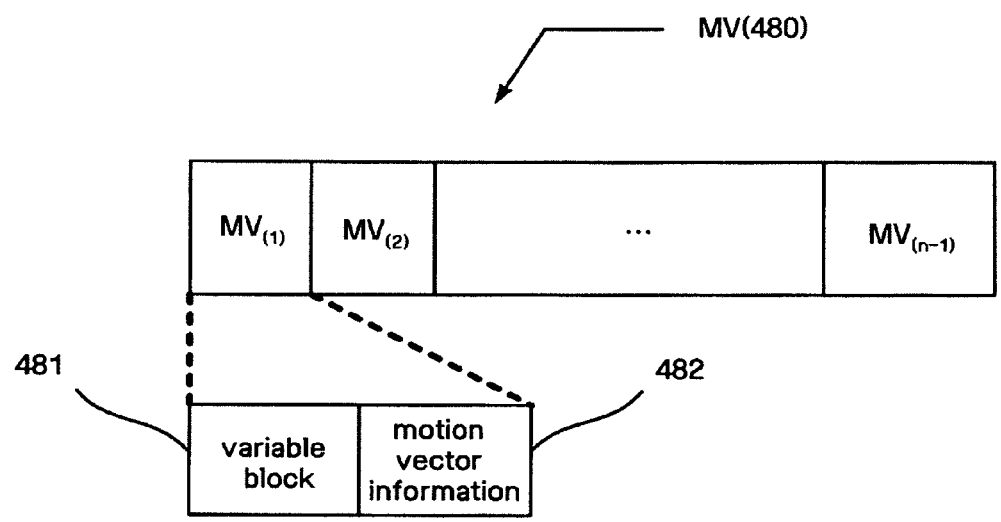
FIG. 17 is a view showing a detailed structure of a MV field.

FIGS. 15 to 17 are views showing a structure of a bit stream 400 according to an embodiment of the present invention, and FIG. 15 schematically shows an entire structure of the bit stream 400.

The bit stream 400 includes a sequence header field 410 and a data field 420, and the data field 420 may include one or more GOP fields 430 to 450.

The sequence header field 410 records a characteristic of an image such as the horizontal size (two bytes) and the vertical size (two bytes) of a frame, the size (one byte) of a GOP, a frame rate (one byte), etc.

The data field 420 records entire image information and information (motion vector, reference frame number) necessary for restoration of an additional image.

FIG. 16 shows a detailed structure of each GOP field. The GOP field 430 may include a GOP header field 460, a T(0) field 470, a MV field 480 for recording a set of motion vectors, and a 'the other T' field 490. Herein, the T(0) field 470 records information on a first frame (frame encoded without referring to another frame) according to a first temporal filtering sequence. The 'the other T' field 490 records information on a frame (frame encoded referring to another frame) except for the first frame.

The GOP header field 460 records a characteristic of an image limited to a corresponding GOP instead of a characteristic of an entire image, in contrast with the sequence header field 410. Also, the GOP header field 460 may record a temporal filtering sequence or a temporal level.

FIG. 17 shows a detailed structure of the MV field 480.

Size information, position information, and motion vector information of a variable block, which corresponds to the number of variable blocks, are respectively recorded in a MV (1) field to a MV (n−1) field. Further, multiple pairs of variable block information (size and position) and motion vector information are recorded in the MV field 480. Such motion vector information becomes a motion vector in the case of a base layer, and it becomes a motion vector difference in the case of an enhanced layer.

As described above, according to the present invention, a motion vector of a multi-layer structure can be more effectively compressed.

Further, according to the present invention, a picture quality of an image having the same bit stream can be improved.

The disclosed embodiments of the present invention have been described for illustrative purposes, and those skilled in the art will appreciate that various modifications, additions and substitutions are possible, without departing from the scope and spirit of the invention as disclosed in the accompanying claims.

What is claimed is:

1. A multi-layer video decoding method comprising:
a) analyzing an inputted bit stream to extract texture information and motion information;
b) analyzing the extracted motion information to calculate a reference motion vector with respect to a predetermined enhanced layer, adding a motion difference contained in the motion information and the calculated reference motion vector, thereby restoring a motion vector;
c) performing an inverse-quantization for the texture information to output a transform coefficient;
d) performing an inverse spatial transform to convert the transform coefficient into a transform coefficient of a spatial domain; and
e) performing an inverse temporal filtering for the transform coefficient by means of the restored motion vector, thereby restoring frames constituting a video sequence,
wherein step b) comprises: generating the reference motion vector in the predetermined enhanced layer by means of a block of a base layer corresponding to a predetermined block in the predetermined enhanced layer and motion vectors in blocks around the block; and adding the obtained reference motion vector and the motion vector difference, thereby generating a motion vector.

2. A video decoder supporting a motion vector of a multi-layer structure, the video decoder comprising:
- an entropy decoding module for analyzing an inputted bit stream to extract texture information and motion information;
- a motion vector restoration module for analyzing the extracted motion information to calculate a reference motion vector with respect to a predetermined enhanced layer, adding a motion difference contained in the motion information and the calculated reference motion vector, and thus restoring a motion vector;
- an inverse quantization module for performing an inverse-quantization for the texture information to output a transform coefficient;
- an inverse spatial transform module for performing an inverse spatial transform to convert the transform coefficient into a transform coefficient of a spatial domain; and
- an inverse temporal filtering module for performing an inverse temporal filtering for the transform coefficient by means of the restored motion vector, thereby restoring frames constituting a video sequence, wherein the motion vector restoration module comprises: a reference vector calculation module for generating the reference motion vector in the predetermined enhanced layer by means of a block of a lower layer corresponding to a predetermined block in the predetermined enhanced layer and motion vectors in blocks around the block:
- a filter module for providing a predetermined filter applied to an interpolation process for generating the reference motion vector: and
- a motion add module for adding the obtained reference motion vector and the motion vector difference, and thus generating a motion vector.

* * * * *